March 12, 1929.  A. WICHERT  1,704,958

ELECTRIC RAILWAY SYSTEM

Filed Jan. 6, 1927

Witness
R. Burkhardt

Inventor
Alfred Wichert,
By Cromwell, Greist & Warden
attys.

Patented Mar. 12, 1929.

1,704,958

UNITED STATES PATENT OFFICE.

ALFRED WICHERT, OF MANNHEIM-NEUOSTHEIM, GERMANY, ASSIGNOR TO AKTIEN-GESELLSCHAFT BROWN BOVERI & CIE., OF BADEN, SWITZERLAND, A JOINT-STOCK COMPANY.

ELECTRIC RAILWAY SYSTEM.

Application filed January 6, 1927, Serial No. 159,430, and in Germany January 11, 1926.

My invention relates to electric railway systems, and it has particular relation to systems utilizing combined adhesion and rack drives.

In the operation of railroads extending in part over level road stretches, and in part over heavy grade stretches, it has been customary to use locomotives, or vehicles, having a combined adhesion drive and rack drive. The adhesion drive is principally used over the level stretches of the road, while the rack drive supplies the main part of the propelling power over the inclined stretches of the road. For the satisfactory operation of such railways, it is of utmost importance to insure smooth transition from the adhesion to the rack sections of the railway at all practical speeds, and to eliminate sudden shocks when the toothed wheel enters the rack section at the beginning of a heavy grade in the road.

Among the objects of the present invention is the provision of an electric railway system of the foregoing character in which the adhesion motor and rack motors are so interconnected as to insure smooth transition of locomotives, or vehicles, from one section of the road to the other. A particular object of the invention is the arrangement of the foregoing character for use in connection with the drives employing a plurality of rack motors.

According to the invention the co-ordination of the speeds of the adhesion and rack motors is obtained by connecting the adhesion motor in series with field windings of the rack motors. In order to prevent unbalance of current between the armatures of the rack motors, which are usually connected in parallel, the latter motors are provided with a second set of field windings which are connected in series with their armatures. This arrangement secures correct relationship between the speeds of the two sets of motors under all conditions of operation, in direct response to the tractive efforts to be exercised by the two sets of motors. At the same time, correct current balance between the several motors is obtained.

Figure 1:
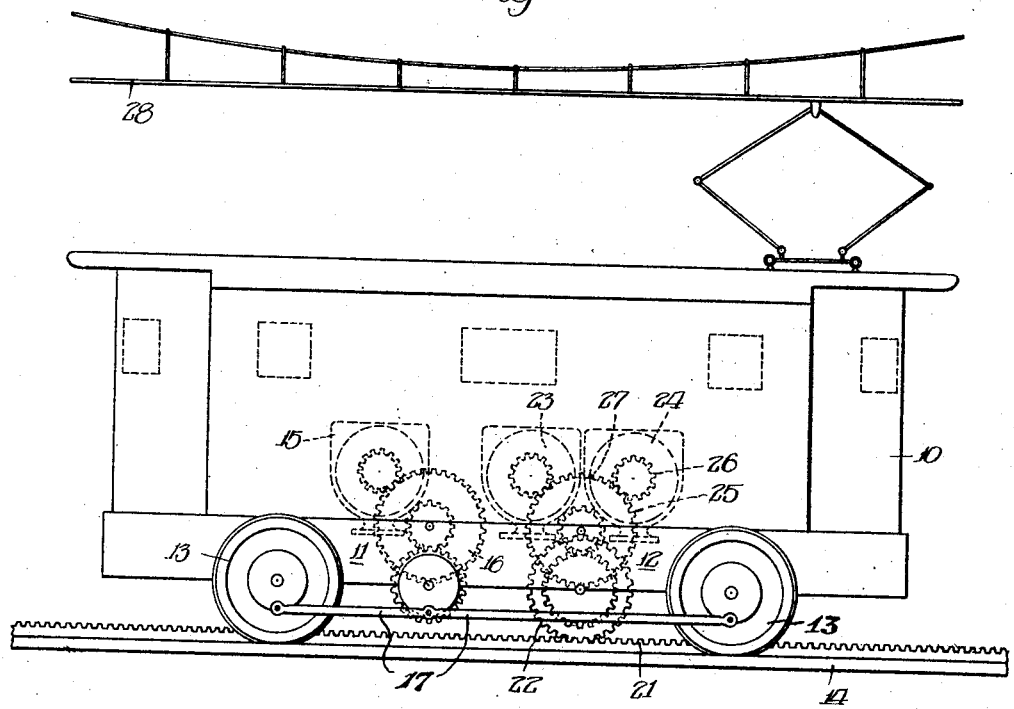
Figure 2:
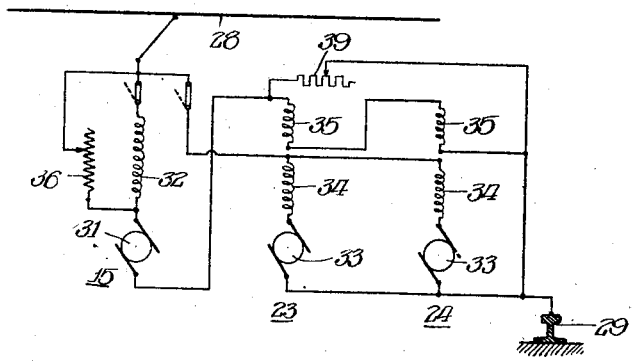

In the accompanying drawings illustrating an exemplification of the invention,

Fig. 1 is an elevational view of an electric locomotive embodying the invention; and Fig. 2 is a circuit diagram of the locomotive drive shown in Fig. 1.

Referring to Fig. 1, an electric locomotive 10 arranged to be operated over level and graded road sections, is provided with an adhesion drive 11 for propelling the locomotive over level sections of the road, and a rack drive 12 for propelling the locomotive over steep grades of the road. The adhesion drive comprises the locomotive wheels 13 arranged to run along the rails 14 in the customary way, the locomotive wheels being rotated by an adhesion motor 15 through the intermediary of a gear mechanism 16 and a driving rod 17. The rack drive comprises a rack 21 extending parallel to the rails 14 over the steep sections of the road. Suitable gear wheels 22 engage the rack 21 and are rotated thereon by means of a pair of rack motors 23, 24. The rack motors impart rotation to the gear wheels 22 through an intermediary mechanism 25 comprising pinions 26 mounted on the motor shafts and a common gear wheel 27 driven thereby.

The adhesion motor 15 and the rack motors 23, 24, of the locomotive shown in the drawing, are of the direct-current type, and are supplied with energy from an overhead trolley line 28 in a customary manner.

For the successful operation of railroads of the foregoing character, it is important that the speed of the gear wheels 22 of the rack drive shall be maintained in a definite relation to the speed imparted to the locomotive by the adhesion drive, in particular, when the locomotive is about to leave a level road section in which it was propelled by adhesion alone, and is to enter a steep road section in which the rack drive is to become effective. If the speed of the rack wheel 22 differs appreciably from the speed corresponding to the locomotive speed, a considerable shock will be exerted on the rack and the rack drive of the locomotive. Under such conditions the locomotive and the road will very soon be damaged or require excessive maintenance.

The present invention avoids the difficulties that may result from lack of co-ordination between the adhesion and rack drives by suitable connections between the two sets of driving motors. To this end, when the locomotive is to enter a rack section, the current from the adhesion motor is lead through the field of the unloaded rack motor during the period of transition. By suitable shunt connections in the field windings the speed characteristics of the adhesion motor and the unloaded rack motor can be so adjusted that the speeds of the two drives are in perfect agreement. Under such conditions there will be no shock on entering the rack section.

The foregoing system of connections is practicable however, only when a single rack motor is used. If there are several rack motors adapted to operate in parallel, a system of connections described above gives difficulties on account of the poor distribution of the current between the several motors. The poor current distribution is a direct result of the difference in the speed characteristics of two otherwise similar motors, these differences in the speed characteristics being largely due to differences in the field fluxes which are present even in case of two similarly constructed motors. When two such motors are arranged to operate a rack drive, such as shown in Fig. 1, the armatures are connected in parallel and the field windings of the two motors are connected in series and traversed by the current from the adhesion motor. By reason of the common gear wheel 25 of the gear mechanism by which the two motors are coupled to the wheel 22, both motors must maintain the same speed. Under such conditions even slight differences in the field structures of the two motors will produce large differences in the electro-motive force of the armatures and result in an unequal distribution of the current between the armatures. Very slight differences in the field structures will then cause very heavy current unbalance between the armatures and cause very often excessive sparking in the commutators and seriously impair the operativeness of the system.

According to the invention the last mentioned difficulties are avoided, and unequal loading of the motors eliminated by providing each of the rack motors with two sets of field windings. One set of field windings is connected in series to receive current from the adhesive motor, while each winding of the other set is connected with the associated armature winding of the respective rack motor.

This system of connection is shown in diagram in Fig. 2. The adhesion motor 15 comprises an armature 31 with a field winding 32, while each of the rack motors, 23, 24, comprises an armature 33 with a serially connected field winding element 34, and an additional field winding element 35. The field winding 32 and the armature 31 of the adhesion motor are connected in series with the two serially connected additional winding elements 35 of the rack motors between the trolley 28 and the return rail 29, respectively. The armatures 33 of the two rack motors are each connected in series with the associated field windings 34 and the two sets of armature and field windings are supplied in parallel from the trolley 28 and return rail 29. By means of a resistor 36 connected in shunt to the field winding 32 of the adhesion motor, the speed of the two sets of motors may readily be so adjusted that the speed of the rack wheel 22 corresponds exactly to the value at which it will run into the rack without a shock. By suitable control of the shunt resistor 36 the load may then be transferred to the rack motors.

The foregoing system of connections effectively prevents current unbalance between the parallel connected rack motor armatures. Thus, for instance, assuming that the speed characteristics of the two motors are different and that one of the motors, namely, motor 23, has a weaker field, the armature of this motor will tend to take a larger current than the other parallel-connected armature of the motor 24. However, an increase of the current through the armature of the motor 23 will immediately increase the flux produced by the associated serially connected field winding 34, thus counteracting the tendency to take more current than the other armature.

The foregoing system of connections thus gives good current balance between the parallel-operating motors despite differences in the speed characteristics of the same.

My invention is susceptible of many modifications other than that specifically described in the specification. For instance, a larger number of motors than shown in the drawings may be used, and instead of one adhesion motor, several may be used, proper provision being made, however, to secure suitable current distribution between the several motors. Instead of having all of the current from the adhesion motors passing through the series field windings 35 of the rack motors, only a part thereof may be passed therethrough as, for instance, by providing a shunt 39 in parallel to the two serially-connected field windings 35.

I claim as my invention:

1. In an electric railway system utilizing combined adhesion and rack drives, an adhesion motor, a rack motor having a field winding element, means for connecting the adhesion motor and said element in series to a source of supply, and means for independently connecting the armature of the rack motor in parallel relation with respect to the series comprising said adhesion motor and said element.

2. In an electric railway system utilizing combined adhesion and rack drives, an adhesion motor and a plurality of rack motors, each of said rack motors comprising two sets of field windings, the field windings of one set being connected in series, means for supplying the field windings of one set with current from the adhesion motor, and means for supplying the field windings of the other set with current from their respective armatures.

3. In an electric railway system utilizing combined adhesion and rack drives, a direct-current motor system comprising an adhesion motor and a plurality of rack motors, each of said rack motors having two field-winding elements, means for causing one field winding element of each rack motor to be traversed by the current of the adhesion motor, and means for causing the other winding element of each rack motor to be traversed by the armature current of said motor.

4. A control system for direct-current driven rail vehicles having separate adhesion and rack driving motors in which the current passing through the armature of the adhesion motor is used to excite the field of the rack motors, characterized by the fact that the rack motors have two sets of field windings, one set of field windings being excited by current from the adhesion motor and the other set of field windings being supplied with current from the respective armatures with which they are associated.

5. In an electric railway system utilizing adhesion and rack drives, an adhesion motor, a plurality of rack motors each having a first and a second set of field windings, means providing for connection of the windings comprising the first set in series with respect to each other and to said adhesion motor, and means providing for connection of the windings comprising the second set in such manner that the same constitute series fields respectively for said rack motors, said second means providing for parallel operation of said rack motors.

In testimony whereof I have hereunto subscribed my name at Berlin on the 18th day of December, A. D. 1926.

ALFRED WICHERT.